US 6,724,776 B1

(12) United States Patent
Jeffries

(10) Patent No.: US 6,724,776 B1
(45) Date of Patent: Apr. 20, 2004

(54) METHOD AND SYSTEM FOR PROVIDING OPTIMAL DISCARD FRACTION

(75) Inventor: Clark Debs Jeffries, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,190

(22) Filed: Nov. 23, 1999

(51) Int. Cl.$^7$ ................................................ H04J 3/22
(52) U.S. Cl. ........................ 370/468; 370/231; 370/412
(58) Field of Search ....................... 370/229, 230–238, 370/412–418, 428, 429, 465, 468; 709/227, 240

(56) References Cited

U.S. PATENT DOCUMENTS

| | | | |
|---|---|---|---|
| 5,426,736 A | | 6/1995 | Guineau, III |
| 5,463,620 A | | 10/1995 | Sriram |
| 5,497,375 A | * | 3/1996 | Hluchyj et al. .............. 370/232 |
| 5,790,522 A | | 8/1998 | Fichou et al. |
| 5,802,310 A | * | 9/1998 | Rajaraman ................... 709/234 |
| 5,901,147 A | * | 5/1999 | Joffe ............................ 370/412 |
| 5,914,936 A | * | 6/1999 | Hatono et al. ............... 370/230 |
| 5,999,534 A | * | 12/1999 | Kim ........................ 370/395.42 |
| 6,134,218 A | * | 10/2000 | Holden ......................... 370/232 |
| 6,169,748 B1 | * | 1/2001 | Barbas et al. ................ 370/468 |
| 6,178,159 B1 | * | 1/2001 | He et al. ..................... 370/230 |
| 6,178,448 B1 | * | 1/2001 | Gray et al. .................. 709/224 |
| 6,219,728 B1 | * | 4/2001 | Yin ............................... 710/52 |
| 6,252,848 B1 | * | 6/2001 | Skirmont ..................... 370/229 |
| 6,272,109 B1 | * | 8/2001 | Pei et al. ..................... 370/230 |
| 6,324,165 B1 | * | 11/2001 | Fan et al. .................... 370/232 |
| 6,388,993 B1 | * | 5/2002 | Shin et al. ................... 370/233 |
| 6,430,153 B1 | * | 8/2002 | Hughes et al. ............ 370/230.1 |
| 6,438,138 B1 | * | 8/2002 | Kamiya et al. .............. 370/468 |
| 6,442,138 B1 | * | 8/2002 | Yin et al. ..................... 370/232 |
| 6,442,139 B1 | * | 8/2002 | Hosein ........................ 370/236 |
| 6,477,147 B1 | * | 11/2002 | Bocking et al. ............. 370/236 |
| 6,480,911 B1 | * | 11/2002 | Lu ................................. 710/54 |
| 6,490,251 B2 | * | 12/2002 | Yin et al. ................. 370/236.1 |
| 6,510,160 B1 | * | 1/2003 | Nikuie et al. ................ 370/412 |
| 6,535,484 B1 | * | 3/2003 | Hughes et al. .............. 370/230 |
| 6,542,509 B1 | * | 4/2003 | Giroux ........................ 370/397 |
| 6,556,578 B1 | * | 4/2003 | Silverschatz et al. ....... 370/412 |
| 2001/0055313 A1 | * | 12/2001 | Yin et al. .................... 370/466 |
| 2002/0089933 A1 | * | 7/2002 | Giroux et al. .............. 370/236 |

FOREIGN PATENT DOCUMENTS

| | | | | |
|---|---|---|---|---|
| WO | 9826628 | 6/1998 | ........... H04Q/11/01 |

OTHER PUBLICATIONS

XP 000622960 "Analysis of Rate–Based Congestion Control Algorithms For ATM Networks. Part 2: Initial Transient State Analysis" Singapore, Nov. 14–16, 1995, New York, IEEE, US, Nov. 14, 1995, pp. 1095–1101, ISBN:0–7803–2510–9abstract.

XP002161812 "BLUE: A New Class of Active Queue Management Algorithms" Apr. 30, 1999 pp. 1, 5, 9, 15, 25.

International Search Report–PCT–Mar. 19, 2001.

* cited by examiner

*Primary Examiner*—Douglas Olms
*Assistant Examiner*—Van Nguyen
(74) *Attorney, Agent, or Firm*—Sawyer Law Group

(57) ABSTRACT

A method and system for controlling a flow of a plurality of packets in a computer network is disclosed. The network includes a queue having a maximum queue level that is possible. The method and system include determining a queue level for the queue and determining an offered rate of the plurality of packets to the queue. The method and system also include determining a virtual maximum queue level based on the queue level and the maximum queue level and controlling a transmission fraction of the plurality of packets to the queue, based on the queue level, the offered rate and the virtual maximum queue level.

24 Claims, 7 Drawing Sheets

METHOD AND SYSTEM FOR PROVIDING OPTIMAL DISCARD FRACTION

CROSS-REFERENCE TO RELATED APPLICATIONS

The present invention is related to U.S. patent application Ser. No. 09/384,691, filed on Aug. 27, 1999, entitled "NETWORK PROCESSING COMPLEX AND METHODS" and assigned, among others, to the assignee of the present application. The present invention is also related to U.S. patent application Ser. No. 09/448,380, filed on Nov. 23, 1999 entitled "METHOD AND SYSTEM FOR CONTROLLING TRANSMISSION OF PACKETS IN COMPUTER NETWORKS" and assigned to the assignee of the present application.

FIELD OF THE INVENTION

The present invention relates to computer networks, and more particularly to a method and system for controlling discarding and, therefore, transmission of data packets in a computer network.

BACKGROUND OF THE INVENTION

Driven by increasing usage of a variety of network applications, such as those involving the Internet, computer networks are of increasing interest. In order to couple portions of a network together or to couple networks, switches are often used. For example, FIG. 1 depicts a simplified block diagram of a switch 10 which may be used in a computer network. The switch 10 couples hosts (not shown) connected with ports A 12 with those hosts (not shown) connected with ports B 36. The switch 10 performs various functions including classification of data packets provided to the switch 10, transmission of data packets across the switch 10 and reassembly of packets. These functions are provided by the classifier 18, the switch fabric 20 and the reassembler 30, respectively. The classifier 18 classifies packets which are provided to it and breaks each packet up into convenient-sized portions, which will be termed cells. The switch fabric 24 is a matrix of connections through which the cells are transmitted on their way through the switch 10. The reassembler 30 reassembles the cells into the appropriate packets. The packets can then be provided to the appropriate port of the ports B 36, and output to the destination hosts.

Due to bottlenecks in transferring traffic across the switch 10, data packets may be required to wait prior to execution of the classification, transmission and reassembly functions. As a result, queues 16, 22, 28 and 34 may be provided. Coupled to the queues 16, 22, 28 and 34 are enqueuing mechanisms 14, 20, 26 and 32. The enqueuing mechanisms 14, 20, 26 and 30 place the packets or cells into the corresponding queues 16, 22, 28 and 34 and can provide a notification which is sent back to the host from which the packet originated.

Although the queues 16, 22, 28 and 34 are depicted separately, one of ordinary skill in the art will readily realize that some or all of the queues 16, 22, 28 and 34 may be part of the same physical memory resource. FIG. 1B depicts one such switch 10'. Many of the components of the switch 10' are analogous to components of the switch 10. Such components are, therefore, labeled similarly. For example, the ports A 12' in the switch 10' correspond to the ports A 12 in the switch 10. In the switch 10', the queue A 14 and the queue B 22 share a single memory resource 19. Similarly, the queue C 28 and the queue D 34 are part of another single memory resource 31. Thus, in the switch 10', the queues 16, 22, 28 and 34 are logical queues partitioned from the memory resources 19 and 31.

Conventional methods have been developed in order to control traffic flowing through the switch 10 or 10', thereby improving performance of the network in which the switch 10 or 10' is used. In particular, a conventional method known as RED (random early discard or detection) is used. FIG. 2 depicts the conventional method 40 used in RED. The conventional method 40 is typically used by one of the enqueuing mechanisms 14, 20, 26, 32, 14', 20', 26' and 32' to control the traffic through the corresponding queue 16, 22, 28, 34, 16', 22', 28' and 34' respectively. For the purposes of clarity, the method 40 will be explained with reference to the enqueuing mechanism 14 and the queue 16.

At the end of a short period of time, known as an epoch, a queue level of the queue 16 for the epoch is determined by the enqueuing mechanism 14, via step 41. Note that the queue level determined could be an average queue level for the epoch. In addition, the queue level determined could be the total level for the memory resource of which the queue 16 is a part. It is then determined if the queue level is above a minimum threshold, via step 42. If the queue level is not above the minimum threshold, then a conventional transmission fraction is set to one, via step 43. Step 43, therefore, also sets the conventional discard fraction to be zero. The transmission fraction determines the fraction of packets that will be transmitted in the next epoch. The conventional discard fraction determines the fraction of packets that will be dropped. The conventional discard fraction is, therefore, equal to one minus the conventional transmission fraction. A transmission fraction of one thus indicates that all packets should be transmitted and none should be dropped.

If it is determined in step 42 that the queue level is above the minimum threshold, then it is determined whether the queue level for the epoch is above a maximum threshold, via step 44. If the queue level is above the maximum threshold, then the conventional transmission fraction is set to zero and the conventional discard fraction set to one, via step 45. If the queue level is not above the maximum threshold, then the conventional discard fraction is set to be proportional to the queue level of the previous epoch divided by a maximum possible queue level or, alternatively, to some other linear function of the queue level, via step 46. Thus, the conventional discard fraction is proportional to the fraction of the queue 16 that is occupied or some other linear function of the queue level. In step 46, therefore, the conventional transmission is also set to be proportional to one minus the conventional discard fraction. The conventional transmission fraction and the conventional discard fraction set in step 43, 45 or 46 are then utilized for the next epoch to randomly discard packets, via step 47. Thus, when the queue level is below the minimum threshold, all packets will be transmitted by the enqueuing mechanism 14 to the queue 16 during the next epoch. When the queue level is above a maximum threshold, then all packets will be discarded by the enqueuing mechanism 14 during the next epoch or enqueued to a discard queue. When the queue level is between the minimum threshold and the maximum threshold, then the fraction of packets discarded by the enqueuing mechanism 14 is proportional to the fraction of the queue 16 that is occupied or some other linear function of the queue level. Thus, the higher the queue level, the higher the fraction of packets discarded. In addition, a notification may be provided to the sender of discarded packets, which causes the sender to suspend sending additional packets for a period of time. The individual packets which are selected for discarding may also be randomly selected. For example, for each packet, the enqueuing mechanism 14 may generate a random number between zero and one. The random number is compared to the conventional discard fraction. If the random number is less than or equal to the conventional discard fraction, then the packet is dropped. Otherwise, the packet is transmitted to the queue 16. This process of discarding packets based on the transmission fraction is continued until it is determined that the epoch has ended, via step 48. When the epoch ends, the method 40 commences again in step 41 to determine the conventional transmission fraction for the next epoch and drop packets in accordance with the conventional transmission fraction during the next epoch.

Because packets can be discarded based on the queue level, the method 40 allows some control over the traffic through the switch 10 or 10'. As a result, fewer packets may be dropped due to droptail than in a switch which does not have any mechanism for discarding packets before the queue 16 becomes full. Droptail occurs when packets must be dropped because a queue is full. As a result, there is no opportunity to account for the packet's priority in determining whether to drop the packet. Furthermore, in some situations, the method 40 can reduce the synchronization of hosts sending packets to the switch 10 or 10'. This occurs because packets may be dropped randomly, based on the conventional transmission fraction, rather than dropping all packets when the queue level is at or near the maximum queue level. Performance of the switch 10 and 10' is thus improved over a switch that does not utilize RED, that is, a switch that simply drops next arriving packets when its buffer resources are depleted.

Although the method 40 improves the operation of the switches 10 and 10', one of ordinary skill in the art will readily realize that in many situations, the method 40 fails to adequately control traffic through the switch 10 or 10'. Despite the fact that packets, or cells, may be dropped before the queue becomes fall, the hosts tend to become synchronized in some situations. This is particularly true for moderate or higher levels of congestion of traffic in the switch 10 or 10'. The conventional transmission fraction is based on the queue level. However, the queue level may not be indicative of the state of the switch. For example, a queue level below the minimum threshold could be due to a low level of traffic in the switch 10 or 10' (a low number of packets passing through the switch 10 or 10'). However, a low queue level could also be due to a large number of discards in the previous epoch because of high traffic through the switch 10. If the low queue level is due to a low traffic level, increasing the conventional transmission fraction is appropriate. If the low queue level is due to a high discard fraction, increasing the conventional transmission fraction may be undesirable. The conventional method 40 does not distinguish between these situations. As a result, the conventional transmission fraction may be increased when it should not be. When this occurs, the queue may become rapidly filled. The transmission fraction will then be dropped, and the queue level will decrease. When the queue level decreases, the transmission fraction will increase, and the queue may become filled again. The switch 10 or 10' thus begins to oscillate between having queues full and queues empty. As a result, the average usage of the switch 10 or 10' becomes quite low and the performance of the network using the switch 10 or 10' suffers.

Accordingly, what is needed is a system and method for better controlling traffic through the switch. The present invention addresses such a need.

SUMMARY OF THE INVENTION

The present invention provides a method and system for controlling a flow of a plurality of packets in a computer network. The network includes a queue having a maximum queue level that is possible. The method and system comprise determining a queue level for the queue and determining an offered rate of the plurality of packets to the queue. The method and system also comprise determining a virtual maximum queue level based on the queue level and the maximum queue level and controlling a transmission fraction of the plurality of packets to the queue, based on the queue level, the offered rate and the virtual maximum queue level.

According to the system and method disclosed herein, the present invention provides a mechanism for improving the transmission fraction even at higher traffic rates so that the computer network is stable.

DETAILED DESCRIPTION OF THE INVENTION

The present invention relates to an improvement in control of traffic in computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1A:
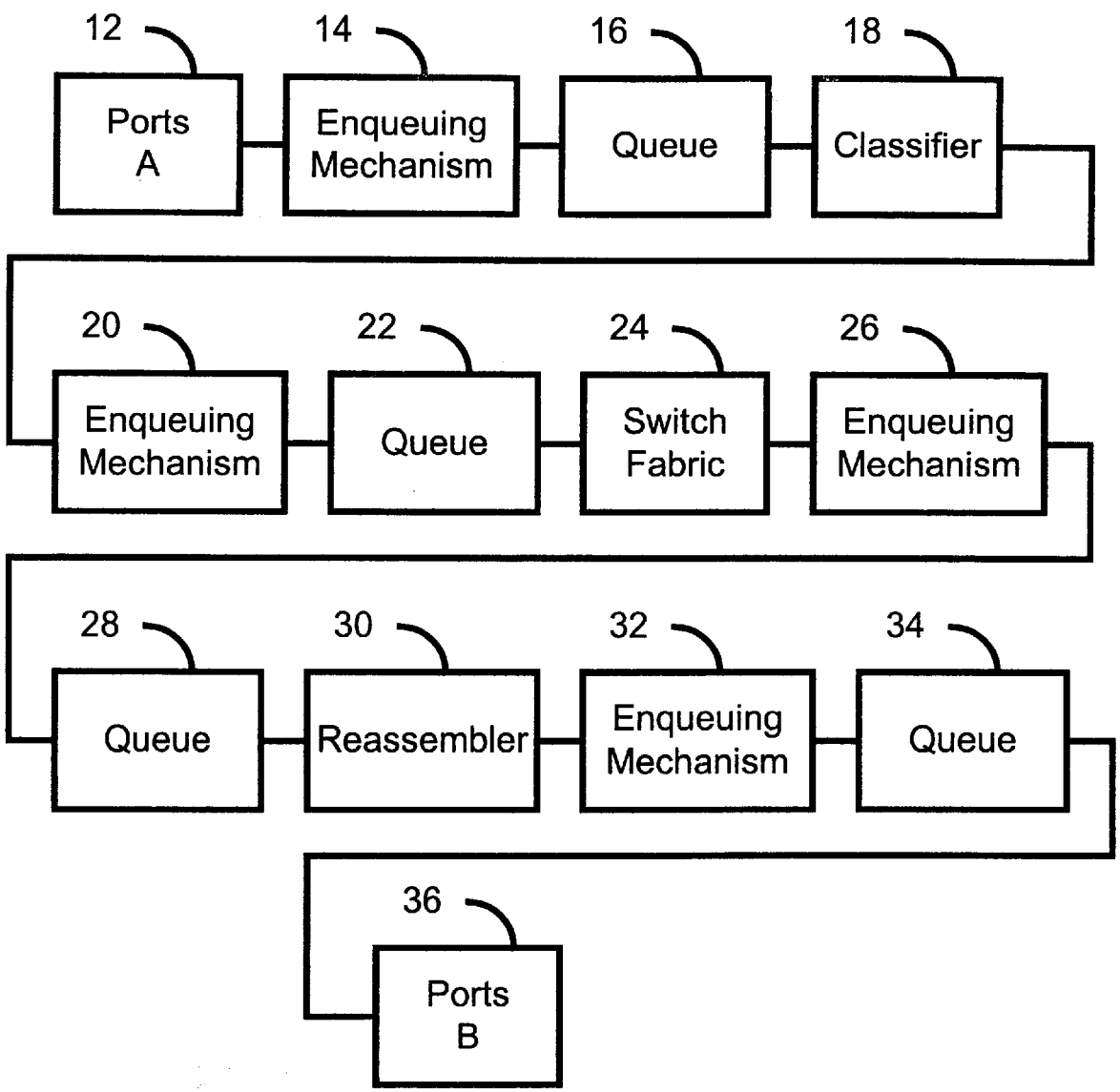
FIG. 1A is a simplified block diagram of a conventional switch.
Figure 1B:
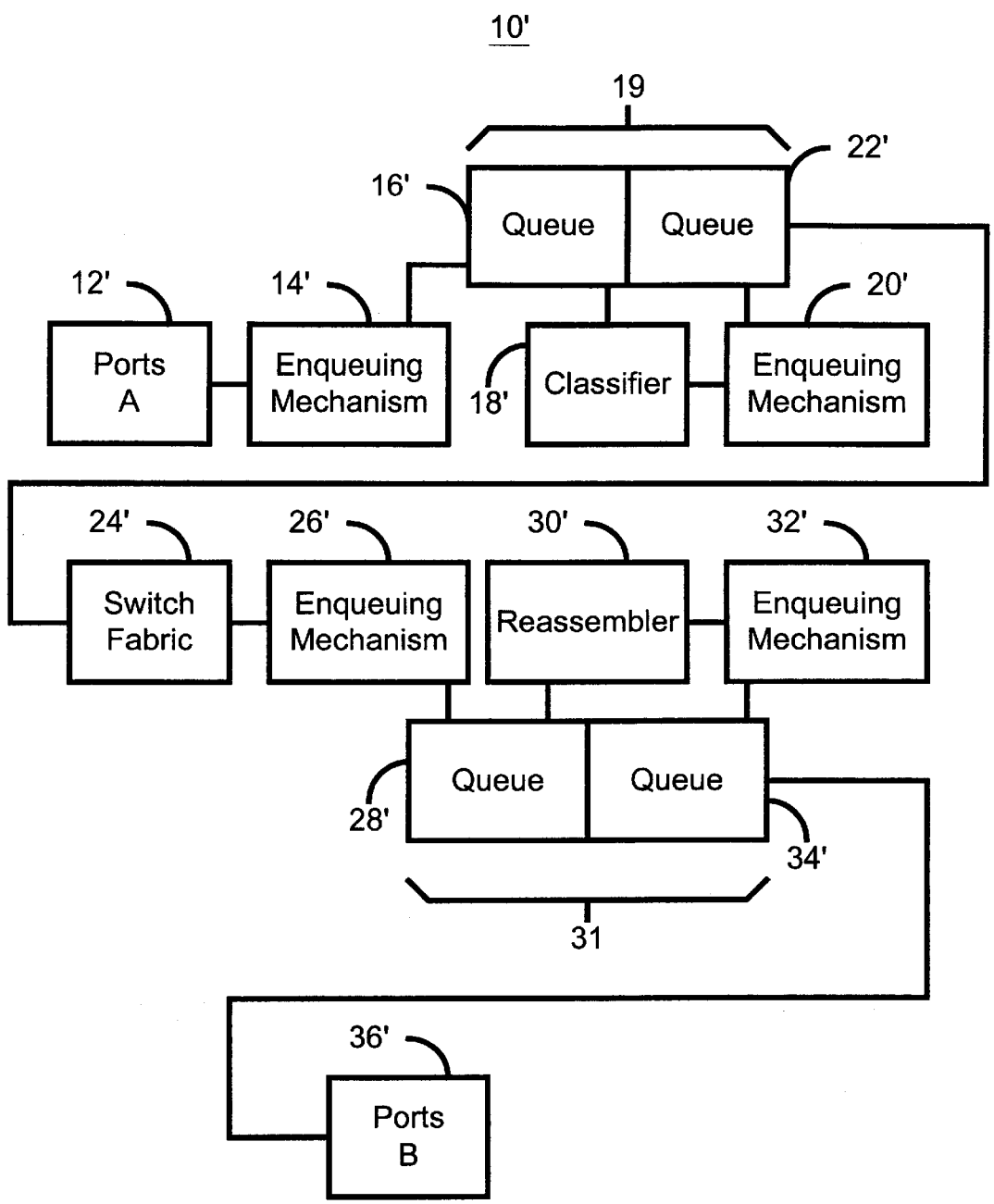
FIG. 1B is a simplified block diagram of another conventional switch.
Figure 2:
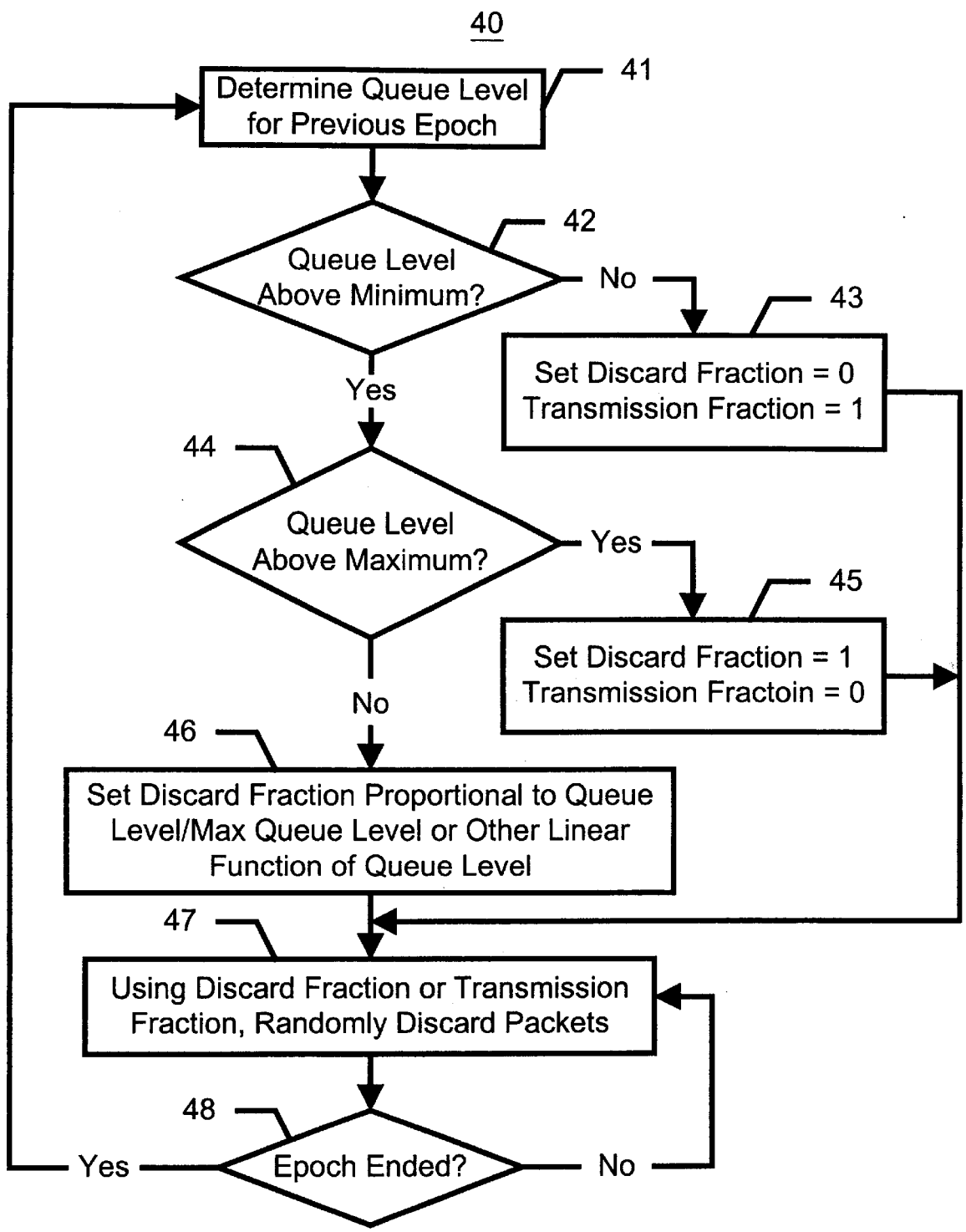
FIG. 2 is a flow chart depicting a conventional method for controlling traffic through a switch.

Switches used in computer networks typically contain queues, which may be logical queues part of the same memory resource or be separate memory resources, in which packets or smaller sized pieces of the packets, called cells, are temporarily placed. The enqueuing mechanisms which place the packets into queues may also have a mechanism for discarding packets in order to control traffic through the switch and improve operation of the network. For example, random early discard or detection (RED), described above in the method 40 of FIG. 2, discards certain packets based on the queue level. Although RED functions in certain situations, in many networks RED fails to improve network performance. For example, networks in which the switches have a moderate or high traffic amount of traffic will still be subject to oscillations. Thus, such networks may carry only a very small amount of traffic in comparison to the capacity for which such networks were designed.

Figure 3:
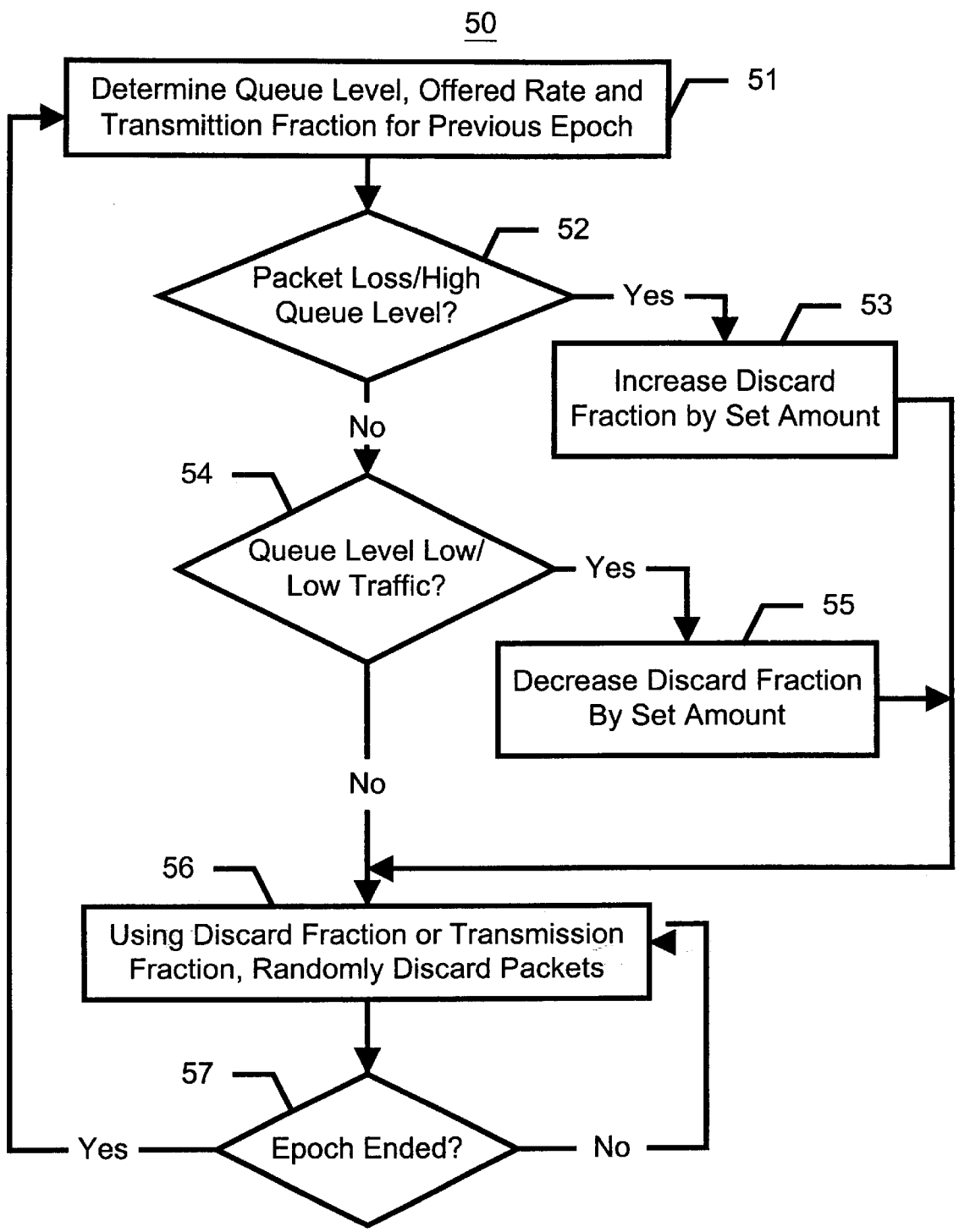
FIG. 3 is a flow chart depicting another conventional method for controlling traffic through a switch.

FIG. 3 depicts a flow chart of a more recent method 50 developed by other individuals of International Business Machines, Inc. of Armonk, N.Y. This method 50 is known as BLUE. The method 50 takes into account not only the queue level, but also the transmission rate and the offered rate. The offered rate is the rate at which packets or cells are offered to the enqueuing mechanism to be provided to the corresponding queue. The method 50 will be described using the enqueuing mechanism 14 and the queue 16. The queue level for the queue 16, the transmission fraction provided to the queue 16 by the enqueuing mechanism 14 and offered rate are determined for the epoch which just ended, via step 51. The offered rate is the rate at which packets are provided to the enqueuing mechanism 14. Thus, the offered rate could come from flows of traffic provided by one or more of the ports A 12.

It is then determined whether there is a packet loss or a queue level greater than some threshold, via step 52. Either event indicates that the discard fraction should be increased. If so, then the discard fraction is incremented by a first constant amount that may be empirically determined, via step 53. Thus, in step 53 the transmission fraction, which is one minus the discard fraction, is decreased. If it is determined in step 52 that the discard fraction should not be increased, then it is determined whether the discard fraction should be decreased, via step 54. The discard fraction should be decreased if the queue level is low or the offered rate is low. If the discard fraction should be decreased, then this is accomplished by subtracting a second constant amount that may also be empirically determined, via step 55. The discard fraction determined in step 53 or 54, if changed, or the old discard fraction is then used to determine the fraction of packets to be transmitted to the queue 16 during the next epoch, via step 56. Thus, in step 56 the packets may be discarded randomly or by also taking into account the each packet's priority. It is thus ensured that the correct discard fraction and, therefore, the correct transmission fraction are maintained. It is then determined whether the epoch has ended, via step 57. If so, step 51 is returned to. Otherwise, the method 50 repeats commencing at step 57. For further details on BLUE, the website http://www.eecs.umich.edu/usuchang/blue/ can be consulted.

Although the method 50 (BLUE) works well for its intended purpose and is an improvement over the conventional method 40 (RED), one of ordinary skill in the art will readily realize that the method 50 may take a relatively long time to reach a stable state. Thus, although performance is improved over the conventional method 40, performance of the network may still be poorer than what is desired.

The present invention is related to U.S. patent application Ser. No. 09/448,380, filed on Nov. 23, 1999, entitled "METHOD AND SYSTEM FOR CONTROLLING TRANSMISSION OF PACKETS IN COMPUTER NETWORKS" and assigned to the assignee of the present application. Applicants hereby incorporate the above-mentioned co-pending U.S. Patent application.

Figure 4:
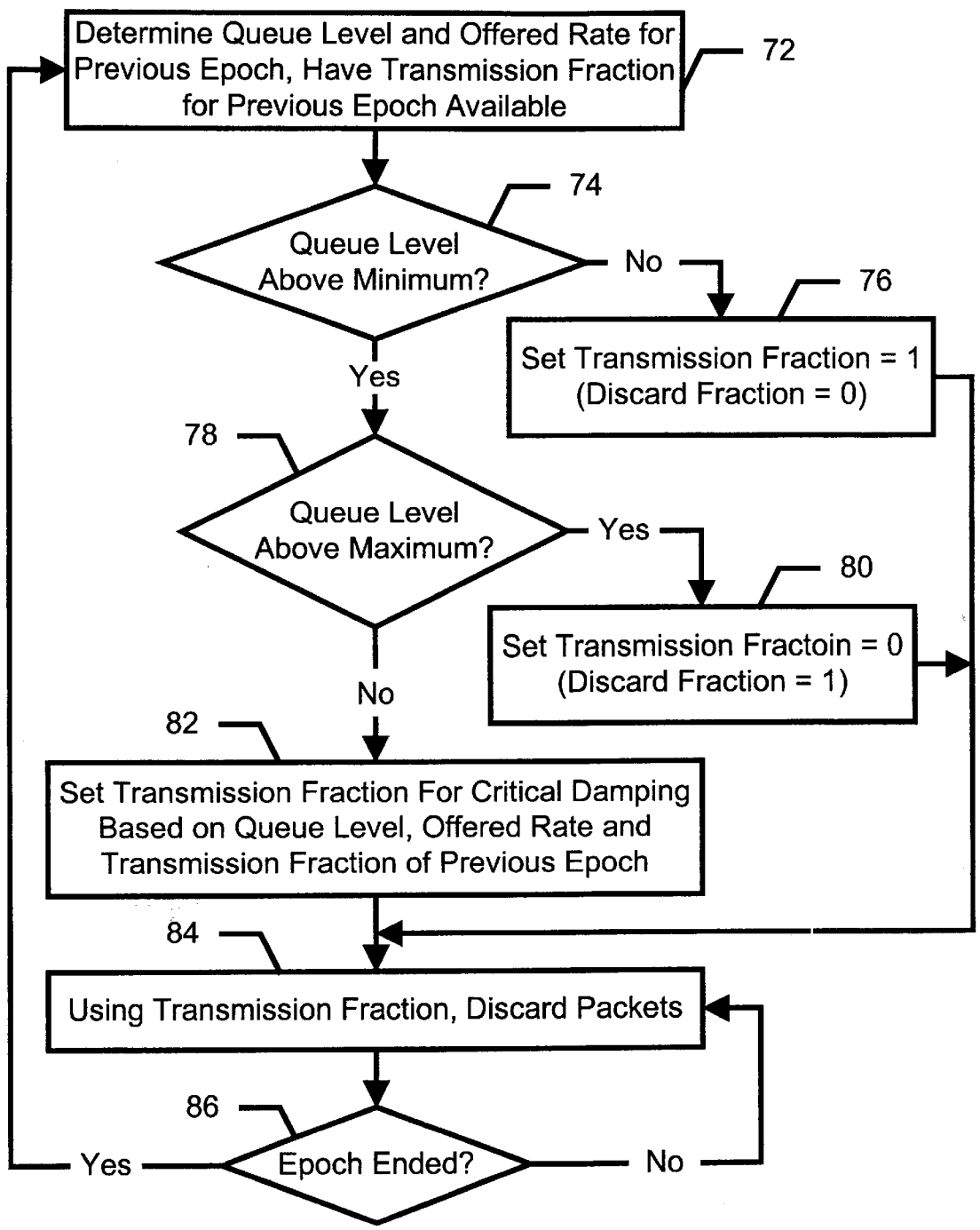
FIG. 4 is a detailed flow chart depicting one embodiment of a recently developed method for controlling traffic through a switch.

The method discussed in the above-mentioned co-pending application is depicted in FIG. 4. The method 70 may be accomplished using the apparatus disclosed in U.S. patent application Ser. No. 09/384,691, filed on Aug. 27, 1999, entitled "NETWORK PROCESSING COMPLEX AND METHODS" and assigned to the assignee of the present application. Applicants hereby incorporate by reference the above-mentioned co-pending U.S. Patent Application. The method 70 can be used with the switch 10 or 10' shown in FIGS. 2A and 2B. For the purposes of clarity, the method 70 will be explained in conjunction with the queue 16 and enqueuing mechanism 14 depicted in FIG. 2A. The method may be used in conjunction with a system in which multiple queues are part of the same memory resource. However, nothing prevents the method 70 from being used in another system in which each queue has a separate memory resource.

Referring to FIGS. 4 and 2A, the queue level and offered rate are determined for the previous epoch, via step 72. The queue level is preferably determined relative to a minimum queue level, $Q_{min}$, and a maximum queue level, $Q_{max}$, at the end of the epoch. The transmission fraction for the previous epoch is also available in step 72. Generally, the transmission fraction will have been determined using the method 70 and thus will be readily available. However, the transmission fraction may be determined if not already available.

It is then determined whether the queue level is above $Q_{min}$, via step 74. If not, then the transmission fraction is set to one, via step 76. Step 76 thus ensures that all packets will be transmitted by the enqueuing mechanism 14 to the queue 16 if the queue level is low enough. If it is determined that the queue level is above $Q_{min}$ in step 74, then it is determined whether the queue level is above $Q_{max}$, via step 78. If the queue level is above $Q_{max}$, then the transmission fraction is set to zero, via step 80. Thus, step 80 ensures that all packets will be discarded if the queue level is too high.

If the queue level is neither below $Q_{min}$ nor above $Q_{max}$, then the transmission fraction is controlled for critical damping, via step 82. The derivation of critical damping using stability theory is discussed in the above-mentioned co-pending application. Preferably, the transmission fraction and the queue level can be determined by the following equations:

$$Q(t+Dt)=Q(t)+[I(t)*T(t)-O(t)]*Dt$$

$$T(t+Dt)=T(t)+(I(t)*Dt/Q_{max})*(A-B*T(t)-Q(t)/Q_{max})$$

where:
- $Q(t)$=Queue level
- $I(t)$=Rate that items (e.g. packets) are offered to enqueuing mechanism
- $T(t)$=Transmission fraction
  =(e.g.) Fraction of items offered to enqueuing mechanism transmitted to queue
- $O(t)$=Rate at which items are output from queue
- $Dt$=Time interval between calculations of Q and T
  =Time for an epoch
- $Q(t)/Q_{max}$ is greater than or equal to 0.25
- $I(t)/O(t)$ is less than or equal to 1.6 and where
- A=A constant that depends upon ranges selected for $Q(t)$ and $I(t)/O(t)$
- B=A constant that depends upon ranges selected for $Q(t)$ and $I(t)/O(t)$ Also note that:
- $D(t)=1-T(t)$
  =Discard Fraction Further, note that $Q(t)$, $I(t)$ and $O(t)$ are inherently non-negative and that $T(t)$ has values in the range [0,1].

Thus, the transmission fraction is set for critical damping based on the queue level, offered rate and transmission fraction from the previous epoch, as well as the length of the epoch. Using the transmission fraction set in step 76, 80, or 82, the packets are transmitted or discarded by the enqueuing mechanism 14 so that the fraction of packets provided to the queue 14 is equal to the transmission fraction, via step 84. The packets are preferably randomly discarded, in a similar manner to what is used in conventional RED, discussed above with respect to FIG. 2. However, referring back to FIG. 4, the packets can also be discarded based on their priority. Furthermore, a notification is preferably sent back to the hosts sending the discarded packets so that the hosts can temporarily suspend traffic to the switch 10'. It is then determined whether the current epoch has completed, via step 86. This may be accomplished by determining whether a particular time has elapsed since the calculation of the transmission fraction was completed. If the epoch has not completed, then step 84 continues. If the epoch has completed, then step 72 is returned to.

Thus, the transmission fraction can be set for critical damping using the method 70. Preferably critical damping occurs only in a desired range of queue levels. Outside of this range, the transmission fraction is set to zero or one, depending on whether the queue level is determined to be too high or too low for a critical damping calculation. Because packets can be discarded randomly or based at least in part on their priority, synchronization of hosts sending traffic to the switch 10 or 10' can be prevented. Because critical damping is provided, the methods 70 can provide better stability for the system than the conventional method 40 (RED). The method 70 also reaches equilibrium more rapidly than the method 50 (BLUE) because critical damping is provided. Consequently, performance of a network using the switch 10 or 10' that utilize the method 70 is improved.

Although the method 70 works well for its intended purpose, one of ordinary skill in the art will readily realize that the method 70 does not function for very high levels of oversubscription. For example, in one embodiment, the method 70 cannot adequately control traffic through the switch 10 or 10' when the oversubscription reaches a level of fifty percent or more. Consequently, some mechanism for accounting for higher traffic in a network is desired.

The present invention provides a method and system for controlling a flow of a plurality of packets in a computer network. The network includes a queue having a maximum queue level that is possible. The method and system comprise determining a queue level for the queue and determining an offered rate of the plurality of packets to the queue. The method and system also comprise determining a virtual maximum queue level based on the queue level and the maximum queue level and controlling a transmission fraction of the plurality of packets to the queue, based on the queue level, the offered rate and the virtual maximum queue level.

The present invention will be described in terms of a particular system and particular components. However, one of ordinary skill in the art will readily recognize that this method and system will operate effectively for other components in a computer network. The present invention will also be described in the context of a queue. However, one of ordinary skill in the art will readily recognize that the present invention functions effectively when queues are logical queues part of a single memory resource or when the queues are part of separate memory resources. The present invention is also described in the context of critical damping of the system. One of ordinary skill in the art will readily recognize, however, that the present invention generally operates over epochs. Thus, the damping provided may not be instantaneous critical damping at each instant of operation. The present invention will also be discussed in terms of packets and queues which are used prior to performing specific operations. However, one of ordinary skill in the art will readily realize that the method and system operate effectively for other pieces of traffic, such as cells, other queues, and prior to performing other operations. The present invention will also be discussed in terms of controlling network flows by proactively discarding packets. However, one of ordinary skill in the art will readily realize that the method and system control the rate of packets arriving in a queue and that a signal sent to a source and dictating a fraction of packets to be sent, with others held at the source, would be effective. Therefore, control of a transmission fraction is analogous control of a rate at which packets are offered, for example by one or more sources.

Figure 5:
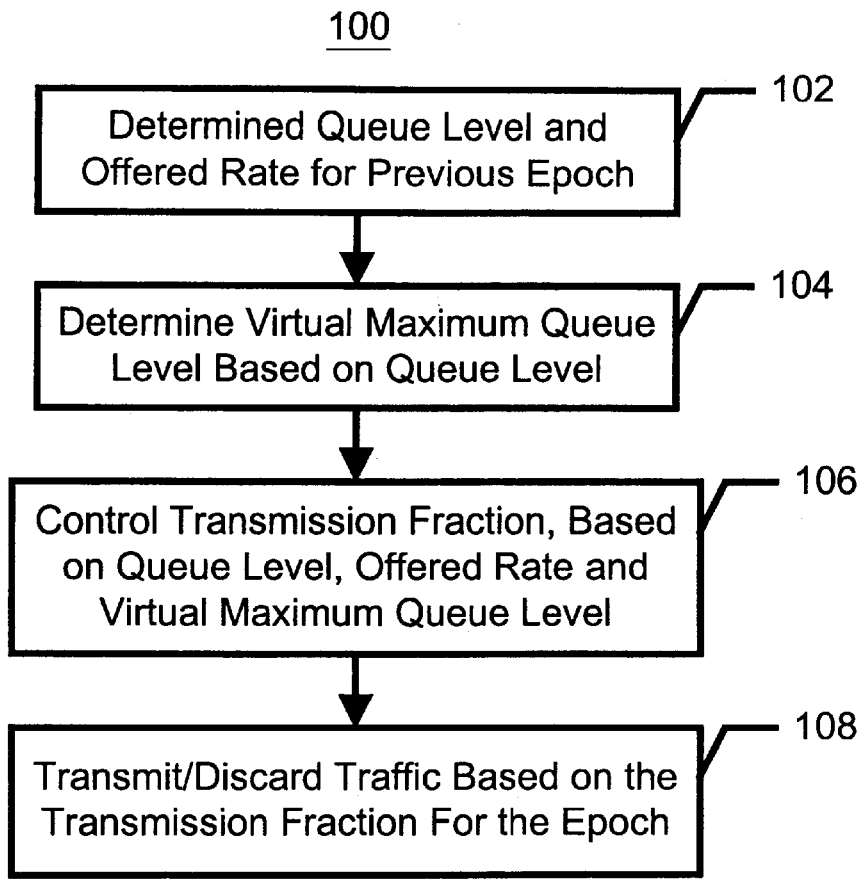
FIG. 5 is a flow depicting one embodiment of a method for providing optimal discard fraction in accordance with the present invention.

To more particularly illustrate the method and system in accordance with the present invention, refer now to FIG. 5, depicting one embodiment of a method 100 in accordance with the present invention. The method 100 is preferably accomplished using the apparatus disclosed in U.S. patent application Ser. No. 09/384,691, filed on Aug. 27, 1999, entitled "NETWORK PROCESSING COMPLEX AND METHODS" and assigned to the assignee of the present application. The method 100 can be used with the switch 10 or 10' shown in FIGS. 2A and 2B. For the purposes of clarity, the method 100 will be explained in conjunction with the queue 16 and enqueuing mechanism 14 depicted in FIG. 2A. However, the method 100 can be used with other queues, such as the queues 22, 28, 34, 16', 22', 28' and 34'. The method 100 can also be used with other enqueuing mechanisms, such as the enqueuing mechanisms 20, 26, 32, 14', 20', 26' and 32'. In a preferred embodiment, the method 100 is used in a system in which multiple queues are part of the same memory resource. However, nothing prevents the method 100 from being used in another system in which each queue has a separate memory resource.

Referring to FIGS. 2A and 5, the queue level and offered rate for the prior epoch are determined, via step 102. In a preferred embodiment, the queue level is determined at the end of the previous epoch and is the level of the memory resource. Also in a preferred embodiment, the offered rate determined in step 102 is the total offered input to the memory resource during the prior epoch. In a preferred embodiment, transmission fraction for the prior epoch is also determined in step 102. In an alternate embodiment, the determination of the queue level in the method 100 includes determining the level of the queue 16 corresponding to the enqueuing mechanism 14. Also in a preferred embodiment, the transmission fraction is constant over an epoch and thus can be determined at any time during the previous epoch, but is preferably determined at the start of the previous epoch using the method 100.

A virtual maximum queue level for the queue 16 is determined using the queue level from the prior epoch, via step 104. The virtual maximum queue level is decreased when it is determined that the switch 10 is congested. The virtual maximum queue level is increased, up to a maximum which may be less than or equal to a maximum queue level possible, when it is determined that the switch is not congested. Preferably, this is accomplished by determining that the queue level is above a threshold that is less than a maximum queue level that is possible. In other words, the switch 10 is determined to be congested before the queue 16 fills. Because the virtual maximum queue level is used in determining the transmission fraction, the transmission fraction may be calculated as if the memory resource available for the queue 16 is smaller than the actual size of the memory resource. As a result, during incidents of high congestion, the transmission fraction can be set smaller than the transmission fraction otherwise would be. Consequently, the switch 10 or 10' is better able to cope with situations of high traffic.

The transmission fraction is then controlled based on the queue level, the offered rate and the virtual maximum queue level, via step 106. In a preferred embodiment, the transmission fraction is also controlled so that the system described by the transmission fraction and queue level, after the virtual maximum queue level has been determined, is critically damped. In a preferred embodiment, the transmission fraction is also controlled based on the prior transmission fraction. The range of queue levels over which the transmission fraction is so controlled could extend over all possible queue levels. However, in a preferred embodiment, the range over which the transmission fraction is controlled for critical damping is between a minimum queue level greater than or equal to zero and a maximum queue level less or equal to than the maximum possible queue level. The transmission fraction is also preferably controlled so that the queue level does not exceed the virtual maximum queue level. The transmission fraction is then used to discard packets so that the switch function is maintained, via step 108. The transmission fraction can be used to discard the appropriate fraction of packets because the transmission fraction is equal to one minus the discard fraction. As discussed above, the discard fraction is the fraction of packets to be discarded. In one embodiment, the packets are discarded randomly. However, in another embodiment, the packets are discarded based partially on the priority of the packet. Also in a preferred embodiment, discarding of a packet in step 108 also provides a notification to the sending host that the packet has been discarded. As a result, the host can temporarily suspend traffic to the switch 10.

Figure 6:
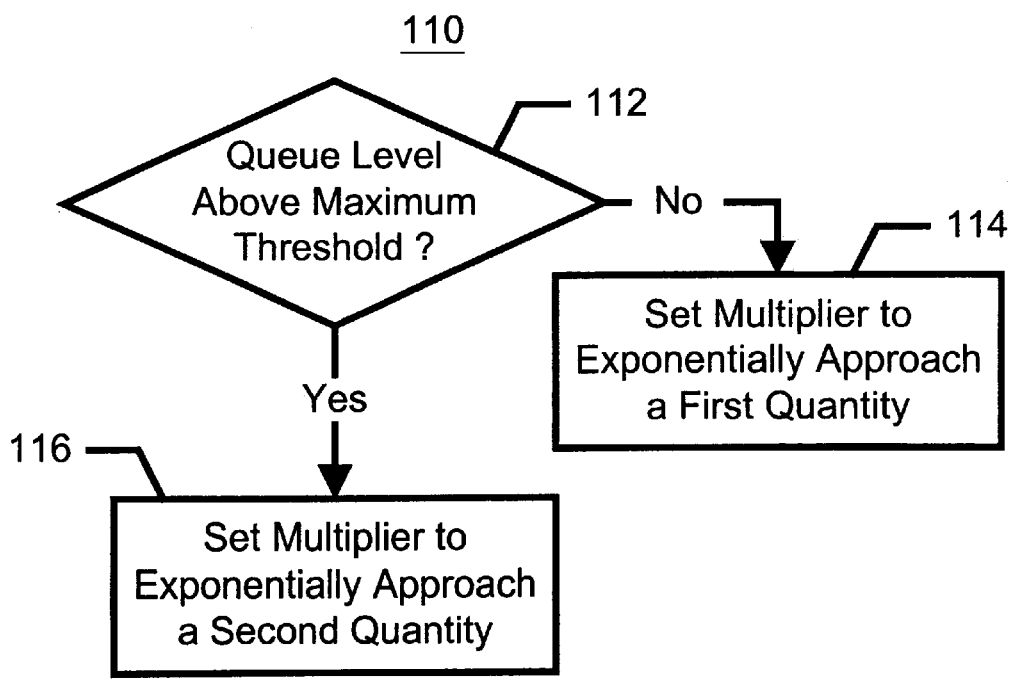
FIG. 6 is a flow chart depicting one embodiment of a method for determining the virtual maximum queue level.

FIG. 6 is a flow chart depicting a preferred embodiment of a method 110 for determining the virtual maximum queue level in step 104 of the method 100. In a preferred embodiment, the method 110 for updating the virtual maximum queue level is performed in parallel with updating the transmission fraction in step 106 of the method 100. Referring back to FIG. 6, it is determined whether the queue level is greater than or equal to a threshold, via step 112. The threshold is preferably a fraction of the maximum queue level. The fraction could be anywhere between zero and 1, but is preferably between ½ and 31/32. Preferably, the threshold is 31/32 of the maximum possible queue level. However, other fractions of the maximum possible queue level could be used, including 127/128, 7/8, 3/4 and ½. However, it should be noted that the queue level may remain below the maximum possible queue level at the cost of reduced throughput. If the queue level is greater than or equal to the threshold, then a multiplier is set, via step 114. In step 114, the multiplier is preferably set according to the function:

$$M(t+Dt)=\text{minimum}\{1,\alpha*M(t)+\beta\}$$

where:
M(t)=Multiplier calculated for the previous epoch
α=A positive constant less than one, and preferably 31/32
β=A positive constant greater than or equal to (1−α), less than one, and preferably ¼

Thus, in a preferred embodiment, the multiplier approaches a first quantity, one in a preferred embodiment, when it is repeatedly determined in step 112 that the queue level exceeds a threshold.

In some flow control algorithms, notably in the method described in the above-mentioned U.S. patent application entitled "METHOD AND SYSTEM FOR CONTROLLING TRANSMISSION OF PACKETS IN COMPUTER NETWORKS," the amount of data enqueued in a buffer is expressed as a fraction of maximum buffer capacity, $Q_{max}$. Thus, $Q_{max}$ appears as a denominator in some expressions, for example as the queue level Q(t) divided by $Q_{max}$, that is $Q/Q_{max}$. The desired definition of virtual buffer capacity is therefore equivalent to use of the quantity $2*M*Q/Q_{max}$. That is, in instances of repeated lack of congestion, when M is ½ or nearly ½, the expression $2*M*Q/Q_{max}$ simply becomes $Q/Q_{max}$. In instances of repeated occurrences of congestion, when M is one or nearly one, the expression $2*M*Q/Q_{max}$ is simply $2*Q/Q_{max}$, or $Q/Q_{max}/2$). Thus, multiplying the queue occupancy fraction $Q/Q_{max}$ by two times the multiplier M has the effect of comparing Q to a virtual buffer capacity, or virtual maximum queue level.

If the queue level is less than the threshold, then the multiplier is set, via step 116. In step 116, the multiplier is preferably set according to the function:

$$M(t+Dt)=\gamma M(t)+\delta$$

where:
M(t)=Multiplier calculated for the previous epoch
γ=A positive constant less than one, and preferably 31/32
δ=A positive constant less than or equal to (1−γ), and preferably 1/64

Thus, in a preferred embodiment, the multiplier approaches a second quantity, namely, one-half, when it is repeatedly determined in step 112 that the queue level is below the threshold.

Thus, steps 114 and 116 determine the multiplier which is an exponentially weighted average of the previous multipliers with an upper limit of one. Furthermore, in instances of repeated congestion, when the queue level is repeatedly higher than the threshold, the multiplier will exponentially approach a first value, preferably one. When congestion is repeatedly avoided, when the queue level is repeatedly lower than the threshold, the multiplier will exponentially approach a second value, preferably one-half.

The virtual buffer capacity, or virtual maximum queue level, is defined as follows. In instances of repeated lack of congestion, when the queue is repeatedly below the threshold, the virtual buffer capacity is the same as the physical buffer capacity, designated as $Q_{max}$. In instances of repeated congestions, when the queue level is repeatedly above the threshold, the virtual buffer capacity is one-half of the physical buffer capacity, or $Q_{max}/2$. Those of ordinary skill in the art will appreciate that some fraction other than ½ might also suffice for the definition of virtual buffer capacity during instances of repeated congestion.

In some flow control algorithms, notably in the method described in the above-mentioned U.S. patent application entitled "METHOD AND SYSTEM FOR CONTROLLING TRANSMISSION FO PACKETS IN COMPUTER NETWORKS," the amount of data enqueued in a buffer is expressed as a fraction of maximum buffer capacity, $Q_{max}$. Thus, $Q_{max}$ appears as a denominator in some expressions, for example as the queue level Q(t) divided by $Q_{max}$, that is $Q/Q_{max}$. The desired definition of virtual buffer capacity is therefore equivalent to use of the quantity $2*M*Q/Q_{max}$. That is, in instances of repeated lack of congestion, when M is ½ or nearly ½, the expression $2*M*Q/Q_{max}$ simply becomes $Q/Q_{max}$. In instances of repeated occurrences of congestion, when M is one or nearly one, the expression $2*M*Q/Q_{max}$ is simply $2*Q/Q_{max}$, or $Q/Q_{max}/2$). Thus, multiplying the queue occupancy fraction $Q/Q_{max}$ by two times the multiplier M has the effect of comparing Q to a virtual buffer capacity, or virtual maximum queue level.

In simulations with multi-switch models, the above definition and use of the multiplier M has been demonstrated to stabilize the calculation of the discard fraction in instances of severe congestion, up to eight to one congestion. Such congestion might momentarily arise in the operation of a switch when several incoming sources happen to have traffic for one outgoing sink.

Figure 7:
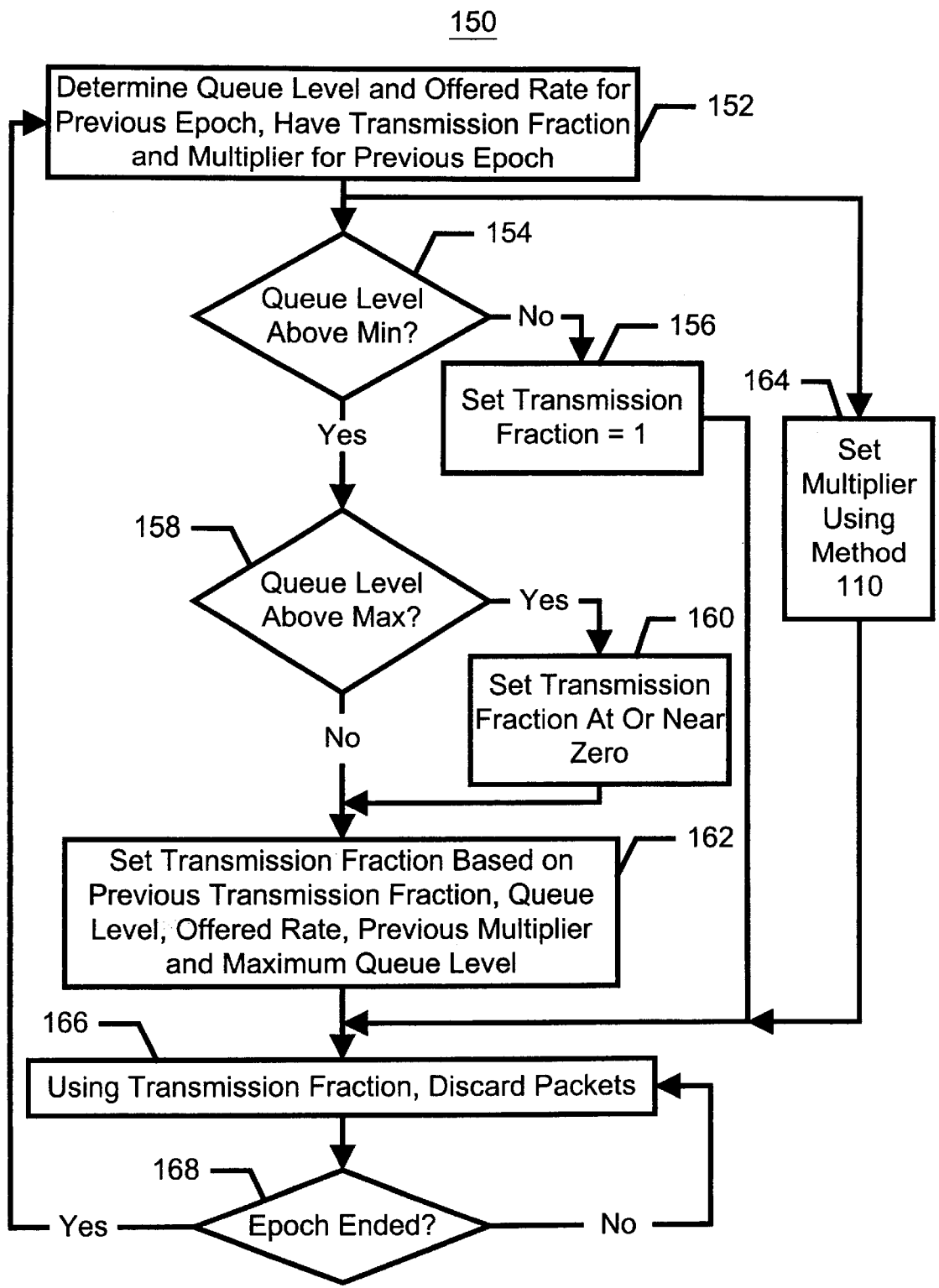
FIG. 7 is a more detailed flow chart depicting an embodiment of a method for providing optimal discard fraction in accordance with the present invention.

FIG. 7 is a more detailed flow-chart of a method 150 in accordance with the present invention for controlling traffic in a network. The method 150 is preferably accomplished using the apparatus disclosed in U.S. patent application Ser. No. 09/384,691, filed on Aug. 27, 1999, entitled "NETWORK PROCESSING COMPLEX AND METHODS" and assigned to the assignee of the present application. The method 150 can be used with the switch 10 or 10' shown in FIGS. 2A and 2B. For the purposes of clarity, the method 150 will be explained in conjunction with the queue 16 and enqueuing mechanism 14 depicted in FIG. 2A. However, the method 150 can be used with other queues, such as the queues 22, 28, 34, 16', 22', 28' and 34'. The method 150 can also be used with other enqueuing mechanisms, such as the enqueuing mechanisms 20, 26, 32, 14', 20', 26' and 32'. In a preferred embodiment, the method 150 is used in a system in which multiple queues are part of the same memory resource. However, nothing prevents the method 150 from being used in another system in which each queue has a separate memory resource.

The queue level and offered rate for the previous epoch are determined, via step 152. Furthermore, the transmission fraction and the multiplier for the previous epoch are also preferably available in step 152 because these quantities were preferably calculated for the previous epoch. If, however, the transmission fraction and multiplier for the previous epoch are not available, these quantities are preferably determined in step 152. It is then determined if the queue level is greater than or equal to a minimum threshold, via step 154. In a preferred embodiment, the minimum threshold is one-quarter of the maximum queue level. If the queue level is not greater than or equal to the minimum threshold, the transmission fraction is set to one.

If the queue level is greater than the minimum threshold, then it is determined whether the queue level is above a maximum threshold, via step 158. In a preferred embodiment, step 158 included determining whether the queue level exceeds the virtual maximum queue level.

If it is determined that the queue level is above the maximum threshold, then the transmission fraction is set at or near zero, via step 160. If, however, it is determined that the queue level is not above the maximum threshold, then using the multiplier for the previous epoch, the queue level, the prior transmission fraction, the offered rate and the maximum queue level, the transmission fraction is determined, via step 162. In a preferred embodiment, the transmission fraction is give by:

$$T(t+Dt)=\text{minimum}\{1,\text{maximum}(\tfrac{1}{8}, T(t)+(2*I(t)*M(t)*Dt/Q_{max})*(9/4-2*T(t)-2*M(t)*Q(t)/Q_{max}))\}$$

where:

M(t)=the multiplier from the previous epoch

Dt=the length of the epoch in appropriate time units

Note that in the equation for T(t+Dt) the multiplier M(t) appears. Both T and M are simultaneously updated every Dt time units. In addition, not that the multiplier M(t) appears twice in the equation for T(t+Dt). It appears in the term $2*M(t)*Q(t)/Q_{max}$ as described above. The effect is to divide buffer capacity by two in instances of repeated congestion. The multiplier M(t) also appears in the term $2*M(t)*I(t)*Dt/Q_{max}$. Here the number of bits offered to the queue system over the time interval Dt is $I(t)*Dt$. This amount is compared to Qmax to result in a fraction $I(t)*Dt/Q_{max}$. This fraction is then multiplied by $2*M(t)$. Again, the affect is to divide buffer capacity by two in instances of congestion.

In a preferred embodiment, in parallel with the calculation of the transmission fraction, the multiplier is updated, via step 164. In a preferred embodiment, the multiplier is updated using the method 110 depicted in FIG. 6. Note, however, that nothing prevents the multiplier from being updated in series with the transmission fraction. Furthermore, nothing prevents the use of the multiplier for the current epoch in calculating the transmission fraction for the current epoch. However, in such a case, the mathematical formula for the transmission fraction in step 162 of FIG. 7 will be different.

Using the transmission fraction set in step 156, step 160 or step 162, the enqueuing mechanism 14 proactively discards packets to maintain the function of the switch 10, via step 166. It is determined whether the epoch has ended, via step 168. If not, then step 166 is returned to. Otherwise, step 152 is repeated.

The methods 100 and 150 are stable, allowing traffic to be controlled in the switch 10 or 10'. Furthermore, using the method 100 or 150, a high amount of traffic can be accounted for using the virtual maximum queue level or the multiplier. Thus, a switch 10 or 10' utilizing one embodiment of the method 100 or 150 might accommodate an oversubscription of eight hundred percent. Thus, the switch 10 or 10' continues to function without filling the queue or memory resource even when highly oversubscribed. Furthermore, using the method 150, the transmission function and queue level are critically damped, assuming the multiplier is already set or is otherwise considered constant for the purposes of determining damping. Because the queue level and transmission fraction are critically damped, the switch 10 or 10' will reach equilibrium as rapidly as possible.

A method and system has been disclosed for optimizing the flow of traffic through a network, particularly where there is a high oversubscription. Software written according to the present invention is to be stored in some form of computer-readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a flow of a plurality of packets in a computer network including a queue having a maximum queue level that is possible, the method comprising the steps of:

(a) determining a queue level for the queue;

(b) determining an offered rate of the plurality of packets to the queue;

(c) determining a virtual maximum queue level based on the queue level and the maximum queue level; wherein the virtual maximum queue level determining step further includes the steps of:
- (c1) increasing the virtual maximum queue level to a maximum that is less than or equal to the maximum queue level if the queue level is above a first threshold; and
- (c2) decreasing the virtual maximum queue level if the queue level is below a second threshold; and
- (d) controlling a transmission fraction of the plurality of packets to the queue, based on the queue level, the offered rate and the virtual maximum queue level.

2. A method for controlling a flow of a plurality of packets in a computer network including a queue having a maximum queue level that is possible, the method comprising the steps of:
- (a) determining a queue level for the queue;
- (b) determining an offered rate of the plurality of packets to the queue;
- (c) determining a virtual maximum queue level based on the queue level and the maximum queue level, wherein the virtual maximum queue level determining step (c) further includes the steps of
  - (c1) providing a multiplier for the maximum queue level, the multiplier being an exponentially weighted average which approaches a first level if the queue level is below a threshold and which approaches a second level if the queue level is above the threshold, the first level corresponding to the virtual queue level being a minimum virtual queue level and the second level corresponding to the virtual queue level being the maximum queue level;
- (d) controlling a transmission fraction of the plurality of packets to the queue, based on the queue level, the offered rate and the virtual maximum queue level, and wherein the transmission fraction controlling step further includes the step of
  - (d1) controlling the transmission fraction based on the queue level, the offered rate, a previous transmission fraction, the multiplier and the maximum queue level.

3. The method of claim 2 wherein the multiplier providing step (c1) further includes the step of:
- (c1i) setting the multiplier equal to a first constant multiplied by a previous multiplier plus a second constant if the queue level is below the threshold; and
- (c1ii) setting the multiplier equal to the first constant multiplied by the previous multiplier plus a third constant if the queue level is above the threshold.

4. The method of claim 3 wherein the transmission fraction controlling step (d1) further includes the step of:
- (d1i) controlling the transmission fraction to be one if the queue level is below a minimum queue level; and
- (d1ii) controlling the transmission fraction to be the minimum of one and a second value, the second value being the maximum of a fourth constant and a third value, the third value being the previous transmission fraction plus a fourth value, the fourth value being a fifth value multiplied by a sixth value, the fifth value being a fifth constant multiplier by a previous multiplier multiplied by the offered rate multiplied by a time interval divided by the maximum queue level, the sixth value being a sixth constant minus a seventh constant multiplied by the previous transmission fraction minus an eighth constant multiplied by the previous multiplier multiplied by the queue level divided by the maximum queue level.

5. The method of claim 4 wherein the queue level is a previous queue level and the offered rate is a previous offered rate.

6. The method of claim 1 wherein the queue further includes a hardware memory resource.

7. The method of claim 1 wherein the transmission fraction controlling step (d) further includes the step of:
- (d1) discarding a portion of the plurality of packets based on the transmission rate and a priority of each packet in the plurality of packets.

8. A computer-readable medium containing a program for controlling a flow of a plurality of packets in a computer network including a queue having a maximum queue level that is possible, the program including instructions for:
- (a) determining a queue level for the queue;
- (b) determining an offered rate of the plurality of packets to the queue;
- (c) determining a virtual maximum queue level based on the queue level and the maximum queue level, wherein the virtual maximum queue level determining instructions (c) further includes instruction for:
  - (c1) increasing the virtual maximum queue level to a maximum that is less than or equal to the maximum queue level if the queue level is above a first threshold; and
  - (c2) decreasing the virtual maximum queue level if the queue level is below a second threshold; and
- (d) controlling a transmission fraction of the plurality of packets to the queue, based on the queue level, the offered rate and the virtual maximum queue level.

9. A computer-readable medium containing a program for controlling a flow of a plurality of packets in a computer network including a queue having a maximum queue level that is possible, the program including instructions for:
- (a) determining a queue level for the queue;
- (b) determining an offered rate of the plurality of packets to the queue;
- (c) determining a virtual maximum queue level based on the queue level and the maximum queue level, wherein the virtual maximum queue level determining instructions (c) further includes the steps of
  - (c1) providing a multiplier for the maximum queue level, the multiplier being an exponentially weighted average which approaches a first level if the queue level is below a threshold and which approaches a second level if the queue level is above the threshold, the first level corresponding to the virtual queue level being a minimum virtual queue level and the second level corresponding to the virtual queue level being the maximum queue level; and
- (d) controlling a transmission fraction of the plurality of packets to the queue, based on the queue level, the offered rate and the virtual maximum queue level, wherein the transmission fraction controlling step further includes the step of
  - (d1) controlling the transmission fraction based on the queue level, the offered rate, a previous transmission fraction, the multiplier and the maximum queue level.

10. The computer-readable medium of claim 9 wherein the multiplier providing instructions (c1) further includes instructions for:
- (c1i) setting the multiplier equal to a first constant multiplied by a previous multiplier plus a second constant if the queue level is below the threshold; and (c1ii) setting the multiplier equal to the first constant multiplied by the previous multiplier plus a third constant if the queue level is above the threshold.

11. The computer-readable medium of claim 10 wherein the transmission fraction controlling instructions (d1) further includes instructions for:
  (d1i) controlling the transmission fraction to be one if the queue level is below a minimum queue level; and
  (d1ii) controlling the transmission fraction to be the minimum of one and a second value, the second value being the maximum of a fourth constant and a third value, the third value being the previous transmission fraction plus a fourth value, the fourth value being a fifth value multiplied by a sixth value, the fifth value being a fifth constant multiplier by a previous multiplier multiplied by the offered rate multiplied by a time interval divided by the maximum queue level, the sixth value being a sixth constant minus a seventh constant multiplied by the previous transmission fraction minus an eighth constant multiplied by the previous multiplier multiplied by the queue level divided by the maximum queue level.

12. The computer-readable medium of claim 11 wherein the queue level is a previous queue level and the offered rate is a previous offered rate.

13. The computer-readable medium of claim 8 wherein the queue further includes a hardware memory resource.

14. The computer-readable medium of claim 8 wherein the transmission fraction controlling instructions (d) further includes instructions for:
  (d1) discarding a portion of the plurality of packets based on the transmission rate and a priority of each packet in the plurality of packets.

15. A system for controlling a flow of a plurality of packets in a computer network, the system comprising:
  a queue for storing a portion of the plurality of packets, the queue having a maximum queue level that is possible;
  an enqueuing mechanism, coupled with the queue, for receiving an offered rate of the plurality of packets and for determining a virtual maximum queue level based on a queue level for the queue and the maximum queue level, the enqueuing mechanism also for controlling a transmission fraction of the plurality of packets to the queue, the transmission rate being controlled based on the queue level for the queue, the offered rate and the virtual maximum queue level wherein the enqueuing mechanism further increases the virtual maximum queue level to a maximum that is less than or equal to the maximum queue level if the queue level is above a first threshold and decreases the virtual maximum queue level if the queue level is below a second threshold.

16. A system for controlling a flow of a plurality of packets in a computer network, the system comprising:
  a queue for storing a portion of the plurality of packets, the queue having a maximum queue level that is possible;
  an enqueuing mechanism, coupled with the queue, for receiving an offered rate of the plurality of packets and for determining a virtual maximum queue level based on a queue level for the queue and the maximum queue level, the enqueuing mechanism also for controlling a transmission fraction of the plurality of packets to the queue, the transmission rate being controlled based on the queue level for the queue, the offered rate and the virtual maximum queue level wherein the enqueuing mechanism further provides a multiplier for the maximum queue level, the multiplier being an exponentially weighted average which approaches a first level if the queue level is below a threshold and which approaches a second level if the queue level is above the threshold, the first level corresponding to the virtual queue level being a minimum virtual queue level and the second level corresponding to the virtual queue level being the maximum queue level; and wherein the enqueuing mechanism further controls the transmission fraction based on the queue level, the offered rate, a previous transmission fraction, the multiplier and the maximum queue level.

17. The system of claim 16 wherein the enqueuing mechanism further sets the multiplier equal to a first constant multiplied by a previous multiplier plus a second constant if the queue level is below the threshold and sets the multiplier equal to the first constant multiplied by the previous multiplier plus a third constant if the queue level is above the threshold.

18. The system of claim 17 wherein the enqueuing mechanism further controls the transmission fraction to be the minimum of one and a second value, the second value being the maximum of a fourth constant and a third value, the third value being the previous transmission fraction plus a fourth value, the fourth value being a fifth value multiplied by a sixth value, the fifth value being a fifth constant multiplier by a previous multiplier multiplied by the offered rate multiplied by a time interval divided by the maximum queue level, the sixth value being a sixth constant minus a seventh constant multiplied by the previous transmission fraction minus an eighth constant multiplied by the previous multiplier multiplied by the queue level divided by the maximum queue level.

19. The system of claim 18 wherein the queue level is a previous queue level and the offered rate is a previous offered rate.

20. The system of claim 15 wherein the queue further includes a hardware memory resource.

21. The system of claim 15 wherein the enqueuing mechanism further discards a portion of the plurality of packets based on the transmission rate and a priority of each packet in the plurality of packets.

22. The method of claim 1 wherein congestion is determined based upon the queue level.

23. The computer-readable medium of claim 10 wherein congestion is determined based upon the queue level.

24. The system of claim 15 wherein congestion is determined based upon the queue level.

* * * * *

UNITED STATES PATENT AND TRADEMARK OFFICE
CERTIFICATE OF CORRECTION

| | | |
|---|---|---|
| PATENT NO. | : 6,724,776 B1 | Page 1 of 1 |
| APPLICATION NO. | : 09/448190 | |
| DATED | : April 20, 2004 | |
| INVENTOR(S) | : Clark D. Jeffries | |

It is certified that error appears in the above-identified patent and that said Letters Patent is hereby corrected as shown below:

In column 3, line 38, delete "fall", replace with --full--.

Signed and Sealed this

Twenty-ninth Day of August, 2006

JON W. DUDAS
*Director of the United States Patent and Trademark Office*